(12) United States Patent
Blom et al.

(10) Patent No.: US 9,052,208 B2
(45) Date of Patent: Jun. 9, 2015

(54) METHOD AND APPARATUS FOR SENSING BASED ON ROUTE BIAS

(75) Inventors: Jan Otto Blom, Lutry (CH); Julian Charles Nolan, Pully (CH)

(73) Assignee: NOKIA TECHNOLOGIES OY, Espoo (FI)

( * ) Notice: Subject to any disclaimer, the term of this patent is extended or adjusted under 35 U.S.C. 154(b) by 431 days.

(21) Appl. No.: 13/427,366

(22) Filed: Mar. 22, 2012

(65) Prior Publication Data

US 2013/0253817 A1    Sep. 26, 2013

(51) Int. Cl.
| | | |
|---|---|---|
| *G01C 21/00* | (2006.01) | |
| *G06F 17/00* | (2006.01) | |
| *G01C 21/32* | (2006.01) | |
| *G06F 17/30* | (2006.01) | |
| *H04W 4/02* | (2009.01) | |
| *G01C 21/36* | (2006.01) | |

(52) U.S. Cl.
CPC .................. *G01C 21/32* (2013.01); *H04W 4/02* (2013.01); *G01C 21/3644* (2013.01); *G06F 17/30241* (2013.01)

(58) Field of Classification Search
CPC ....... H04W 4/00; H04W 4/001; H04W 4/003; H04W 4/005; H04W 4/006; H04W 4/008; H04W 4/02; H04W 4/021; H04W 4/022; H04W 4/023; H04W 4/025; H04W 4/026; H04W 4/027; H04W 4/028; H04W 4/04; H04W 4/043; H04W 4/046; H04W 4/185; H04W 40/00; H04W 40/20; G01C 11/00; G01C 11/02; G01C 11/025; G01C 11/04; G01C 11/06; G01C 11/08; G01C 11/10; G01C 11/12; G01C 11/14; G01C 11/16; G01C 11/18; G01C 11/20; G01C 11/22; G01C 11/24; G01C 11/26; G01C 11/28; G01C 11/30; G01C 11/32; G01C 11/34; G01C 21/00; G01C 21/005; G01C 21/3438; G01C 21/3453; G01C 21/3476; G01C 21/3484; G01C 21/36; G01C 21/3602; G01C 21/3605; G01C 21/3617; G01C 21/362; G01C 21/3623; G01C 21/3626; G01C 21/3629; G01C 21/3632; G01C 21/3635; G01C 21/3638; G01C 21/3641; G01C 21/3644; G01C 21/3647; G01C 21/365; G01C 21/3652; G01C 21/3655; G01C 21/3673; G01C 21/3679; G01C 21/3682; G01C 21/3691; G01C 21/3694; G01C 21/3697; G01C 21/34; G01C 21/3407; G01C 21/3415; G01C 21/3423; G01C 21/343; G01C 21/3446; G06F 17/00; G06F 2221/2111; G06Q 10/047; G06T 19/003; G06T 2207/20092; G09B 29/007; H04N 21/25841; H04N 2201/3252; H04N 2201/3253; H04N 5/23222; Y10S 707/99943; Y10S 707/99948

USPC ................ 701/300, 400, 410, 426, 533, 541; 348/207.11

See application file for complete search history.

(56) References Cited

U.S. PATENT DOCUMENTS

| | | | |
|---|---|---|---|
| 2006/0277089 A1* | 12/2006 | Hubbard et al. | ................... 705/9 |
| 2009/0310851 A1 | 12/2009 | Arcas et al. | |
| 2010/0009700 A1* | 1/2010 | Camp et al. | ................. 455/456.6 |
| 2010/0150120 A1* | 6/2010 | Schlicht et al. | ............... 370/338 |
| 2010/0296571 A1 | 11/2010 | El-Saban et al. | |
| 2011/0069179 A1 | 3/2011 | Bathiche et al. | |
| 2011/0109726 A1 | 5/2011 | Hwang et al. | |
| 2012/0038633 A1* | 2/2012 | Clark et al. | ................... 345/419 |

FOREIGN PATENT DOCUMENTS

WO    WO 2010/105186 A1    9/2010

OTHER PUBLICATIONS

Flickr from Yahoo!, Flickr: The Help Forum: Photo download facility on private website?, web page, 2012 Yahoo! Inc., http://www.flickr.com/help/forum/en-us/72157626426987032/.

Vikas SN, Teliport.me building a crowdsourced streetview with their 360 Panorama App, web page, Aug. 6, 2011, pp. 3, India Part of the Next Web Family, Bangalore, India.

* cited by examiner

*Primary Examiner* — Jerrah Edwards
(74) *Attorney, Agent, or Firm* — Ditthavong & Steiner, P.C.

(57) ABSTRACT

An approach is provided for sensing based on route bias. The goal processor processes and/or facilitates a processing of one or more geo-routes, one or more location anchors, or a combination thereof associated with one or more devices to determine proximity information of the one or more devices to one or more sensing goals. The goal processor causes, at least in part, a selection of at least a subset of the one or more devices to participate in the one or more sensing goals based, at least in part, on the proximity information.

19 Claims, 14 Drawing Sheets

METHOD AND APPARATUS FOR SENSING BASED ON ROUTE BIAS

BACKGROUND

Service providers and device manufacturers (e.g., wireless, cellular, etc.) are continually challenged to deliver value and convenience to consumers by, for example, providing compelling network services. One area of interest has been the development of gathering and providing content and information. For example, mobile devices may now help plan routes (e.g., with global positioning system (GPS) navigation systems) to help associated users meet at specific locations, or organize instant crowds at specific locations for marketing events. In addition, applications are being developed specifically for mobile devices, and services also exist to provide mobile device users with more suitable content and information. Nonetheless, generating content and information collaboratively, is not usually done with consideration to the convenience of users. As such, service providers and device manufacturers face significant technical challenges to making collaborative content and information generation fit into the routines of device users.

SOME EXAMPLE EMBODIMENTS

Therefore, there is a need for an approach for sensing based on route bias.

According to one embodiment, a method comprises processing and/or facilitating a processing of one or more geo-routes, one or more location anchors (e.g., places that are frequently visited by one or more users), or a combination thereof associated with one or more devices to determine proximity information of the one or more devices to one or more sensing goals. The method also comprises causing, at least in part, a selection of at least a subset of the one or more devices to participate in the one or more sensing goals based, at least in part, on the proximity information According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more geo-routes, one or more location anchors, or a combination thereof associated with one or more devices to determine proximity information of the one or more devices to one or more sensing goals. The apparatus is also caused to cause, at least in part, a selection of at least a subset of the one or more devices to participate in the one or more sensing goals based, at least in part, on the proximity information.

According to another embodiment, a computer-readable storage medium carries one or more sequences of one or more instructions which, when executed by one or more processors, cause, at least in part, an apparatus to process and/or facilitate a processing of one or more geo-routes, one or more location anchors, or a combination thereof associated with one or more devices to determine proximity information of the one or more devices to one or more sensing goals. The apparatus is also caused to cause, at least in part, a selection of at least a subset of the one or more devices to participate in the one or more sensing goals based, at least in part, on the proximity information.

According to another embodiment, an apparatus comprises means for processing and/or facilitating a processing of one or more geo-routes, one or more location anchors, or a combination thereof associated with one or more devices to determine proximity information of the one or more devices to one or more sensing goals. The apparatus also comprises means for causing, at least in part, a selection of at least a subset of the one or more devices to participate in the one or more sensing goals based, at least in part, on the proximity information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for sensing based on route bias are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
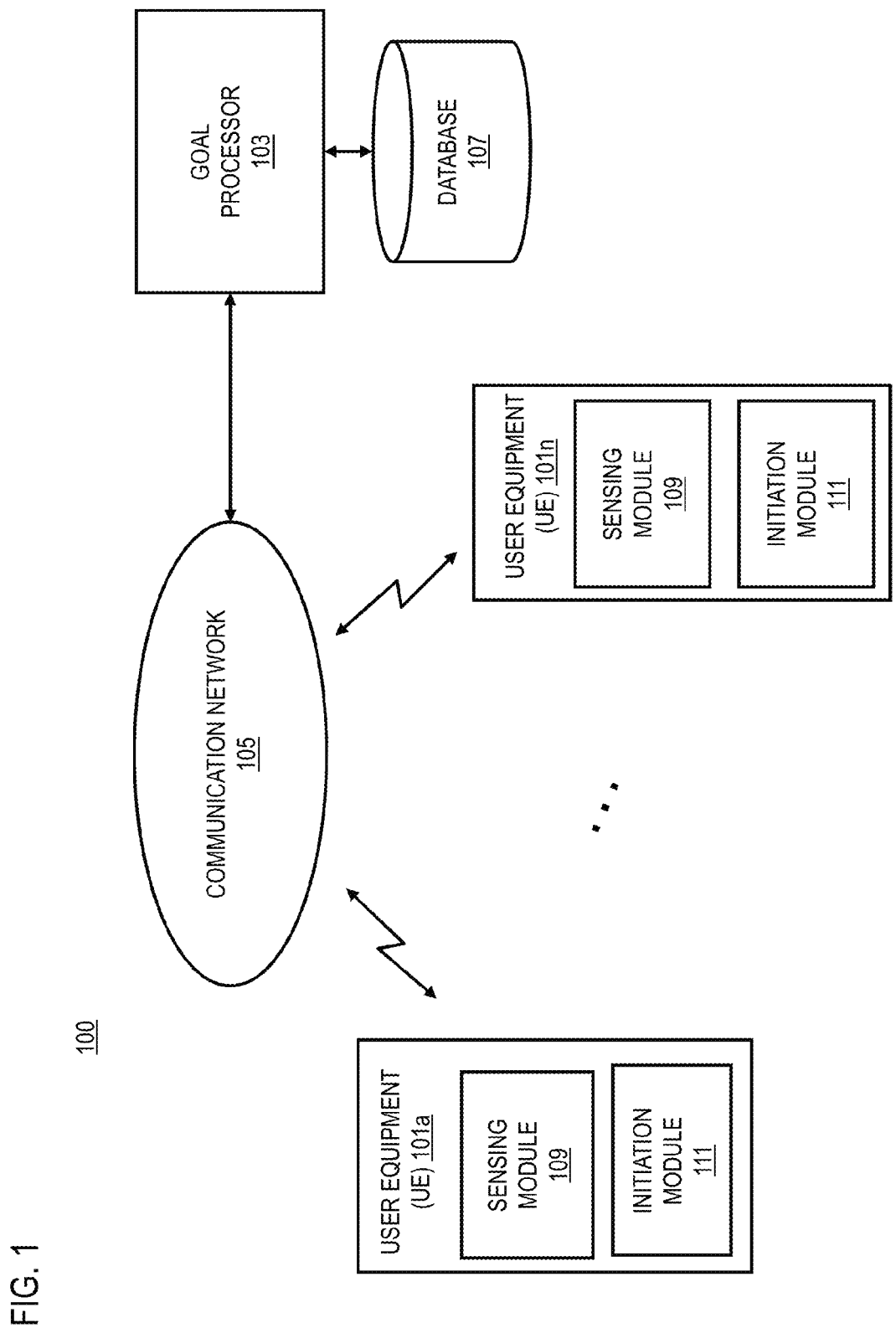
FIG. 1 is a diagram of a system capable of sensing based on route bias, according to one embodiment.

FIG. 1 is a diagram of a system capable of sensing based on route bias, according to one embodiment. As discussed, recent technological advances and developments have increased demand for suitable content and information. In turn, sensing technologies have changed significantly to respond to the demand. For example, mobile devices may now help plan routes (e.g., with GPS navigation systems) to help associated users meet at specific locations, or organize instant crows at specific locations for marketing events. In addition, applications are being developed for mobile devices in particular, and services also exist to provide mobile device users with more suitable content and information. More specifically, generating content collaboratively is increasingly imperative to meeting the heightened demand for content. There are a growing number of sensors and user interface technologies that permit users to capture new types of information. With this technology, users have been able to collect images or sensor data for themselves. However, with increasing need for new types of content, such as immersive three-dimensional (3D) environments and multi-perspective 3D photography, multiple samples acquired from different locations may be needed. To achieve this type of content, collaborative sensing with multiple users may be necessary. Nonetheless, generating content and information collaboratively, is not presently done with consideration to the convenience of users. Users may be unwilling to contribute to collaborative content if contributing requires excessive disturbance to their daily routines. As such, service providers and device manufacturers face significant technical challenges to making collaborative content and information generation fit into the routines of device users.

To address this problem, a system 100 of FIG. 1 introduces the capability to provide sensing based on route bias. Users may be selected to participate in collaborative content generation based on the proximity of their geo-routes and anchor points to the sensing goal. In other words, users are selected for participation based on the degree of "route bias" needed to contribute to the sensing goal. In one embodiment, the system 100 may allow users to collaboratively acquire sensor data by biasing their daily route or current location. In another embodiment, this may be extended to users who, according to their geo-routines or anchor points, are likely to be at, or proximate, the sensing goal at particular times for time variant sensing goals.

In one embodiment, an anchor point or location anchor refers to places that are frequently visited (e.g., both physically and/or virtually through, for instance, frequent searches, references, etc.) by one or more users. In other embodiments, location anchors may refer to places or areas that are contextually relevant to one or more users. For example, locations anchors may be discovered based one stay points (e.g., places where user remain above threshold criteria). In some embodiments, location anchors may be defined or categorized accordingly to contexts. In other words, depending on the user's context, the system 100 may determine a different set of location anchors for the user. For example, on weekends, a user may have a different set of location anchors when compared to weekdays.

In one embodiment, the system 100 may first identify a sensing goal and a group of users who wish to participate to collectively acquire data. A sensing goal may be a point of interest and/or multiple sub-goals that are defined in proximity to the point of interest. Then, the system 100 may calculate proximity information between the sensing goal and respective users. That is, the system 100 may calculate the route bias for each member of the group based on their current location, known anchor points, or known routes. Next, the system 100 may notify the users that they are proximate sensing goals. Group members who agree to participate may then be guided by system 100 to the location and orientation around the sensing goal to collect sensor data.

In one scenario, a sensing goal may be a 3D rendition of a particular site, such as a museum. The goal may take place in an index or geo-position, or independently of a geo-position. Multiple perspective images may be needed to create an immersive 3D environment of the site. Therefore, to build the 3D environment, the system 100 may invite collaborative groups to participate in creating the environment. The system 100 may take the known routes and/or anchor points of the devices in the collaborative groups, and determine the route bias required for respective users to reach the museum. For example, the museum may be proximate one user's daily commute home, while another user would hypothetically have to deviate far from his daily course to reach the museum. For this situation, the route bias is lower for the first user than the second. Consequently, the system 100 may select the first user or users similar to the first user to participate in the sampling. In doing so, the system 100 facilitates the formation of groups to contribute to collaborative sensing goals.

In one embodiment, the system 100 may further determine the number of samples to obtain to satisfy a sensing goal. For example where the goal is a museum, the system 100 may define that five hundred samples are needed to create the 3D rendition. In a further embodiment, the system 100 may further detail the specifications required to achieve the sensing goals. For instance, the system 100 may determine the angles or positioning of a sensor or mobile device to best gather samples of the museum. In such an example, the sensing process may be less constrained at the beginning, but specifications may become more specific as a sensing goal is closer to completion. Especially where specifications may become more specific, user interfaces may further guide users to complete the samples. In the museum scenario, a user interface may include outlining or highlighting of one or more portions of the museum that require further sampling.

In one embodiment, the system 100 may track and aggregate the samples that have been obtained to update the sensing goal and determine further sampling needs. For instance, if the east wing of a museum has sufficient information to build an immersive 3D model, but the west wing still requires more samples, the sensing goal may be updated to include the west wing independent of the east wing. In such a case, sharing of samples towards a sensing goal may be dynamic so system 100 may track the progress of the sensing goal. Such tracking may mean updating the sensing goal to know what remaining samples are still needed to complete the sensing goal.

In a further embodiment, awareness of the remaining needs to complete the sensing goal may update selection of the devices chosen to participate in the sampling. For example, devices that require little route bias to reach the under-sampled west wing of a museum may be chosen to participate in sampling over devices whose geo-routes and location anchors bring them proximate the east wing, rather than the west wing of the museum. At early points in creating the sensing goal, the devices that required little route bias to reach any part of the museum were invited to participate in sampling. However, once the system 100 determines that samples only need to be collected for the west wing, the system 100 may invite only the devices with low route bias for the east wing, rather than the west wing, to participate in the sensing goal.

In a further embodiment, once sensing goals are reached, the system 100 may share the aggregate product among service users. For example, the system 100 may incorporate a 3D immersive model of a museum into further services to assist in navigation.

In another embodiment, sensing goals may include any sensing parameters, including location, time, and/or activity. The previously discussed museum example is an instance of a location sensing goal. A time sensing goal may include time as a target, for example, the sunset at a given time, regardless of your location. Activity sensing goals may include dynamic goals, such as riots, street parties, car races, public transportation routes, etc. For instance, a sensing goal may be set as a car race, wherein users at various points along a racetrack may capture the cars going by in order to create an aggregate model of the race's progress. In another instance, a sensing goal may include another parameter altogether, such as air quality. In such a scenario, system 100 may prompt users to take air quality samples throughout the day and/or at specific times of the day, at various parts of a city.

Since system 100 may prompt users to participate in sensing goals, the prompt may include communicating to one or more users where the users have an option to deviate from the usual geo-route in order to participate. In one instance, the prompt may appear within a threshold proximity. For example, if a device's geo-route indicates that the device may pass through a certain area proximate a sensing goal, where the sensing goal is a location, the system 100 may generate a prompt notifying the device that it is proximate a sensing goal, and give the device the option to participate in the sensing goal.

Such a prompt may further use navigation services to help the user reach the target location. As previously discussed, the prompt may include further directions to facilitate sampling to achieve the sensing goal. In the example of the 3D museum as a sensing goal, the directions may include information on how to orient the mobile device. For instance, if the mobile device is sensing via a camera, the prompt may include information on how to orient the camera to obtain an optimal sample and/or augmentation techniques as to how to capture the sample. Furthermore, an exact frame may be highlighted or underlined, for instance, in a viewfinder, so the user knows where to point the camera to sample for the sensing goal.

As shown in FIG. 1, the system 100 comprises a user equipment (UE) 101 having connectivity to a goal processor 103 and database 107 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the goal processor 103 may determine one or more sensing goals from the database 107. In one scenario, determining one or more sensing goals may include placing the sensing goal in an index or geo-position. In another scenario, the one or more sensing goals may be completely independent of one or more geo-positions. In a further embodiment, the goal processor 103 may determine the samples needed to obtain the one or more sensing goals. For instance, the goal processor 103 may calculate the number of samples required to complete the one or more sensing goals. In one case, the number of samples may be an initial number that is updated, contingent on the success of sensing goal completion. In one such scenario, if the sensing goal is achieving a 3D immersive environment, the goal processor 103 may initially set the number of samples needed as one thousand samples for a rough model of the environment. From there, the goal processor 103 may determine areas where more detail is needed and re-evaluate the number of samples needed. In one embodiment, the goal processor 103 may further break the sensing goal into sub-goals and determine the number of samples to complete each sub-goal. In addition to determining the number of samples to achieve the one or more sensing goals and/or sub-goals, the goal processor 103 may define one or more sensing specifications for one or more samples to capture samples that may be used effectively towards completing the goals. For instance, sensing specifications for the 3D immersive environment may include details on lighting, location, or orientation to help ensure that the samples captured are the samples needed to complete the sensing goal. As previously discussed, sensing goals may be defined by any sensing parameter, including, at least in part, location, time, and/or activity.

Once the goal processor 103 defines the one or more sensing goals, it may process one or more geo-routes, one or more location anchors, or a combination thereof associated with one or more UEs 101 determine proximity information. In one embodiment, the goal processor 103 may identify all the UEs 101 that may participate in the collaborative sensing. In a further embodiment, the goal processor 103 may then choose, out of all the potential UEs 101 that may participate in the collaborative sensing, a subset of UEs 101 to participate. The goal processor 103 may select the subset based on the processing of the geo-routes and/or location anchors associated with the one or more UEs 101. In one embodiment, the goal processor 103 selects the subset after processing from proximity information between the one or more UEs 101 and the one or more sensing goals. In a further embodiment, the processing yields a measure of the degree of biasing needed to apply to one or more geo-routes and/or one or more location anchors associated with one or more UEs 101. In one scenario, the selection may be based on the least amount of biasing needed to apply. In other words, the one or more UEs 101 that are selected would be those devices that may need to deviate from their usual routes to participate in the sensing goal. Therefore, of all the UEs 101 that may participate, participating in the sensing goal is more convenient for the selected UEs 101 than the un-selected UEs 101, at least from the standpoint of geo-route and/or location anchor information.

In one embodiment, the database 107 may store the one or more sensing goals and one or more sensing specifications for the one or more sensing goals. In a further embodiment, the database 107 may also contain navigation information to cause, at least in part, biasing of the one or more geo-routes and/or location anchors to facilitate the one or more UEs 101 in reaching the sensing goals. In one embodiment, the database 107 may define one or more sensing goals as dynamic such that the goals are re-defined as samples are taken and aggregated by the goal processor 103.

In one embodiment, the one or more sensing modules 109 and one or more initiation modules 111 of each UE 101 work together to gather the samples. In one embodiment, the sensing module 109 receives one or more sensing specifications from the goal processor 103. For instance for a 3D immersive environment sensing goal, the sensing module 109 may receive the specification that a sample must be taken in night mode, facing east. In such a scenario, the initiation module 111 may then create a display for the UE 101 to show that the UE 101 is oriented east, and that the camera setting is set to night mode.

In one embodiment, the initiation module 111 may create a display to initiate participation towards the sensing goal. For example, once a UE 101 is selected, the initiation module 111 may display a screen where one or more users associated with the UE 101 may select whether to participate in the sensing goal and therefore receive further directions on sample collection. For instance, the initiation module 111 may work with the database 107 to navigate the UE 101 to the sensing goal. In another instance, the initiation module 111 may produce a display to instruct the user associated with the UE 101 on how to take one or more samples. In one scenario where the sample is to be a photo of a site, the initiation module 111 may highlight, frame, underline, etc., the site or portion of the site that the user may sample to contribute to the sensing goal.

By way of example, the UE 101, goal processor 103, database 107, sensing modules 109, and initiation modules 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
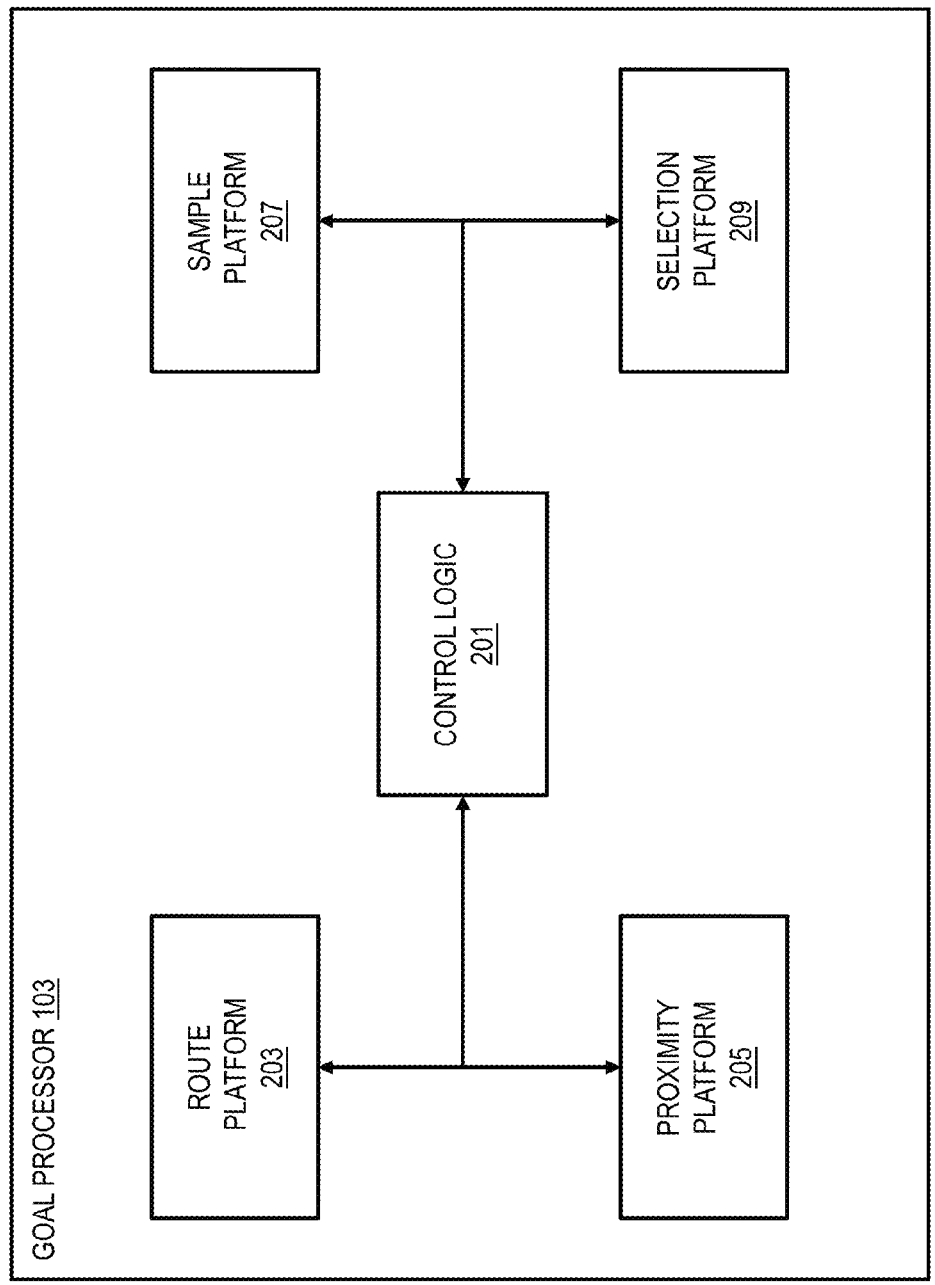
FIG. 2 is a diagram of the components of a goal processor, according to one embodiment.

FIG. 2 is a diagram of the components of the goal processor 103, according to one embodiment. By way of example, the goal processor 103 includes one or more components for providing sensing based on route bias. It is contemplated that the functions of these components may be combined in one or more components or performed by other components of equivalent functionality. In this embodiment, the goal processor includes a control logic 201, route platform 203, proximity platform 205, sample platform 207, and selection platform 209.

The control logic 201 executes at least one algorithm for executing functions at the goal processor 103. For example, the control logic 201 may interact with the route platform 203 to receive one or more geo-routes, one or more location anchors, or a combination thereof associated with one or more UEs 101. In one embodiment, the route platform 203 may determine one or more geo-routes, one or more location anchors, or a combination thereof using historical and/or predicted user information, such as the daily work commute traveled by one or more UEs 101. With the one or more geo-routes and/or one or more location anchors, the control logic 201 and the proximity platform 205 may determine proximity information of one or more UEs 101 to one or more sensing goals. The control logic 201 and the proximity platform 205 may determine proximity information that includes, at least in part, location, temporal, contextual proximity information, or a combination thereof.

The control logic 201 and sample platform 207 may define sensing goals, while the selection platform 209 may select a subset of UEs 101 to participate in sensing goals, based, at least in part, on the proximity information determined by the proximity platform 205. For instance, the UEs 101 with one or more geo-routes and/or one or more location anchors within a certain proximity threshold of one or more sensing goals may be selected out of all the UEs 101 part of communication network 105, to participate in a sensing goal. Alternately, the control logic 201 and selection platform 209 may sort the one or more UEs 101 based on proximity information, and select UEs 101 to participate in the one or more sensing goals as a function of the sorting. For example in one scenario, the control logic 201 and selection platform 209 may determine to select the top ten UEs 101 geographically closest to a given sensing goal to participate in sensing.

In one embodiment, the selection platform 209 may further use the proximity information to determine a degree of biasing to apply to the one or more geo-routes and/or one or more location anchors from route platform 203. With the degree of biasing, the selection platform 209 may interact with route platform 203 and initiation modules 111 of respective UEs 101 to direct the one or more UEs 101 to the one or more sensing goals. For example, the control logic 201 and respective initiation modules 111 may work together to determine navigation guidance information to cause, at least in part, a biasing of the one or more geo-routes and/or location anchors. In one scenario, this may include initiation modules 111 displaying directions on how to reach the sensing goal.

In a further embodiment, the selection platform 209 may select the one or more UEs 101 to participate in the one or more sensing goals based, at least in part, on the degree of biasing. For instance, one or more UEs 101s may be selected to participate in a sensing goal because their history of geo-routes indicates that they will soon be proximate a sensing goal (e.g., regardless of whether the UEs 101 are already near the sensing goal). In this situation, biasing is low because the one or more UEs 101 will soon be within the vicinity of the sensing goal. The selection platform 209 may then select the one or more UEs 101 whose associated geo-routes will require little biasing to reach the sensing goal, relative to the one or more UEs 101 whose associated geo-routes would require major biasing or modification to reach the sensing goal.

Figure 3:
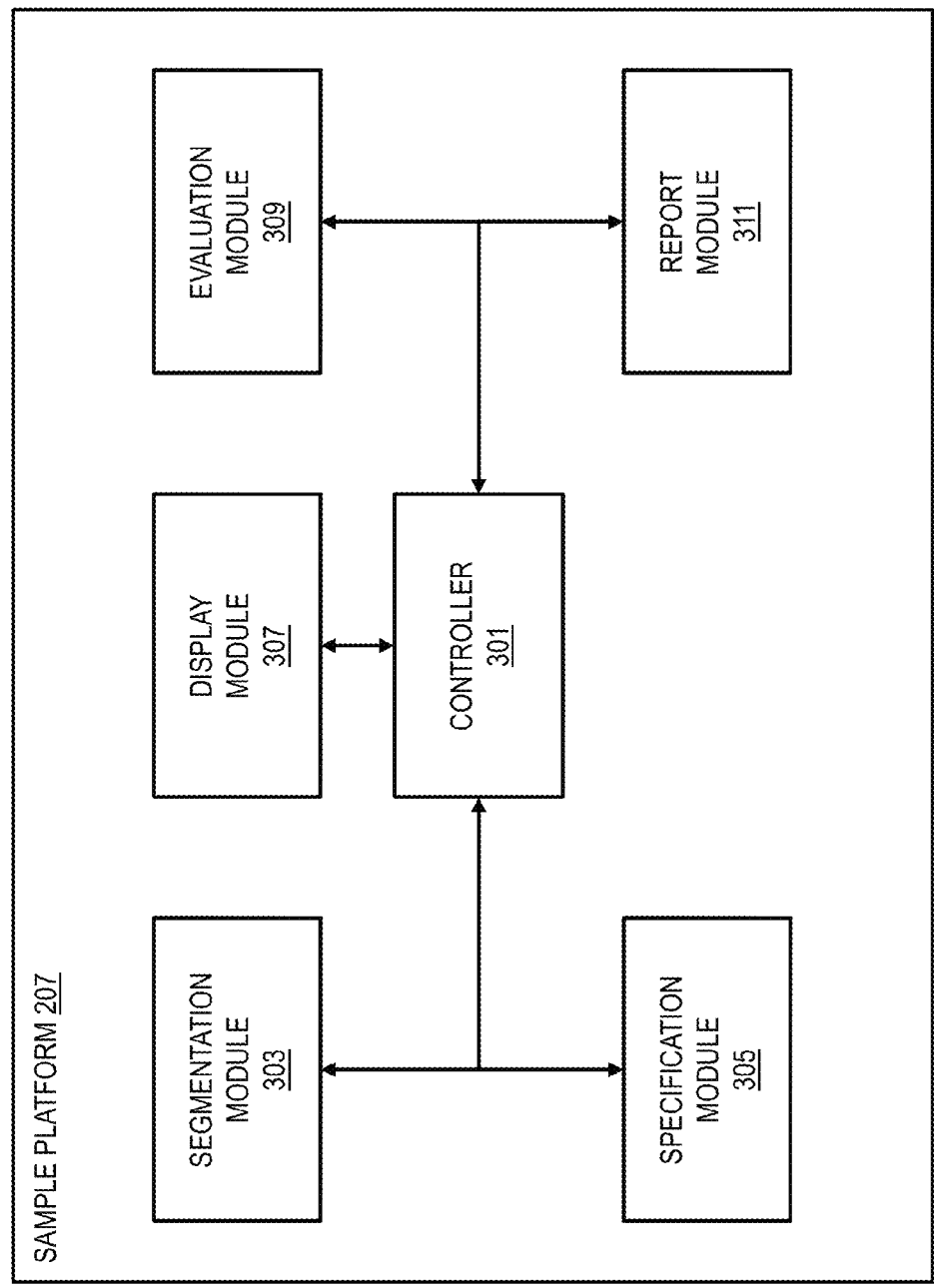
FIG. 3 is a diagram of the components of a sample platform, according to one embodiment.

FIG. 3 is a diagram of the components of a sample platform, according to one embodiment. By way of example, the sample platform 207 includes one or more components for taking one or more samples of one or more sensing goals. It is contemplated that the functions of these components may be combined in one or more components or performed by other components of equivalent functionality. In this embodiment, the goal processor includes a controller 301, segmentation module 303, specification module 305, display module 307, evaluation module 309, and report module 311.

The controller 301 may cause the segmentation module 303 to divide the one or more sensing goals into one or more sub-goals. For instance, if a sensing goal is a museum, a sub-goal may include the museum building itself, museum grounds, and interior exhibits. In another example, the sensing goal of a museum may be divided into sub-goals detailing different aspects of its facade, such as different sides of the museum building. The subset of one or more UEs 101 chosen by the selection platform 209 may be related to the one or more sub-goals defined. The control logic 201 may assign one or more sub-goals to at least a subset of the one or more UEs 101 selected. Such an assignment may be based, at least in part, on proximity information and/or degree of biasing, as described earlier.

Next, the controller 301 may cause the specification module 305 to determine one or more sensing specifications associated with the one or more sensing goals, the one or more sub-goals, or a combination thereof. For example, specification module 305 sensing specifications may include guidance on how to best capture a sample of the sensing goal. In one embodiment, the specification module 305 may provide specifications such as sampling time, how to orient the one or more UEs 101, what settings to apply, or a combination thereof. In a further embodiment, the specification module 305 may work with the display module 307 to more easily direct the one or more UEs 101. For instance, the controller 301, specification module 305, and display module 307 may interact to produce a display where sensing goals and/or sub-goals are highlighted or outlined in an image. Following on the example of a museum facade as a sensing goal, in one scenario, the display module 307 may highlight areas of the facade that require sampling, as the museum appears in the viewfinder of a selected UE 101. The one or more UEs 101 may then more efficiently capture samples that contribute to sensing goals and/or sub-goals.

The evaluation module 309 may work with the controller 301 to process the sample with respect to the sensing goals and/or sub-goals to cause, at least in part, an updating of the one or more goals, sub-goals, assignment, selection of the one or more devices, or a combination thereof. For example, the evaluation module 309 may determine that a sensing goal is complete and no further sensing is required. In another example, the evaluation module 309 may evaluate the sample captured and determine whether it satisfies specifications suggested by the specification module 305. In one embodiment, the evaluation module 309 may interact with the report module 311 to generate one or more completion reports of the one or more goals, the one or more sub-goals, or a combination to cause an updating of the goals and/or sub-goals that need to be captured. In another embodiment, the report module 311 may also inform the one or more UEs 101 of whether their one or more samples satisfied sensing requirements. For instance, after one or more UEs 101 captures a sample, the evaluation module 309 may analyze the sample for adequacy and cause the report module 311 to generate a completion report displayed on one or more UEs 101 showing the success (or lack of success) of the capture. In a further embodiment, the report module 311 may perhaps provide guidance for another sampling, whether because the previous sample was inadequate, or because another goal and/or sub-goal are in close proximity.

Figure 4:
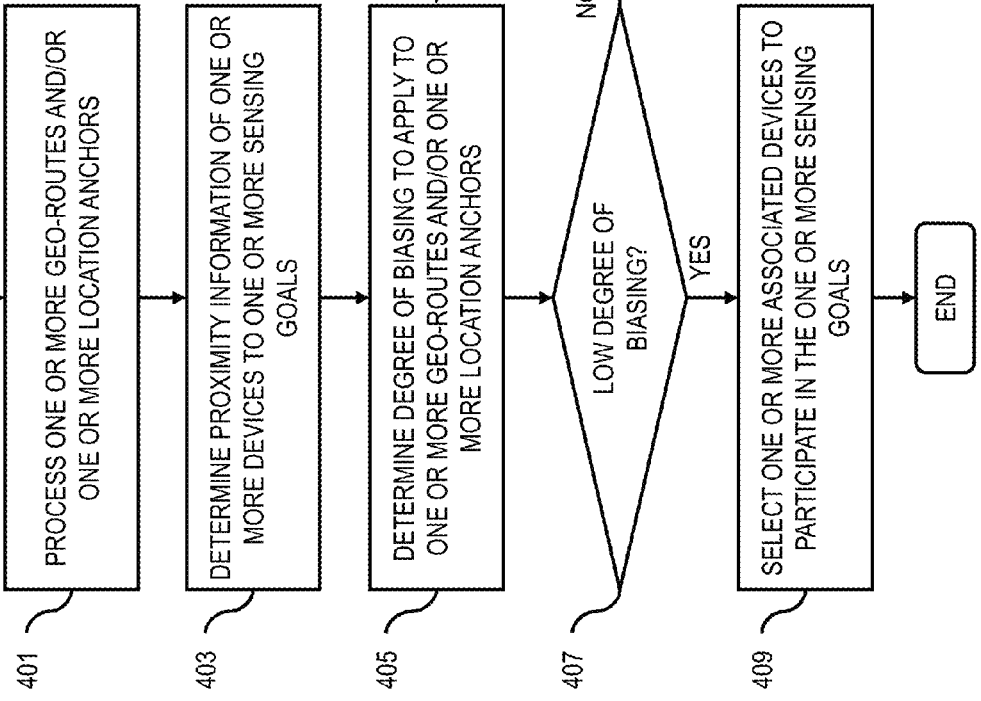
FIG. 4 is a flowchart of a process for sensing based on route bias, according to one embodiment.
Figure 11:
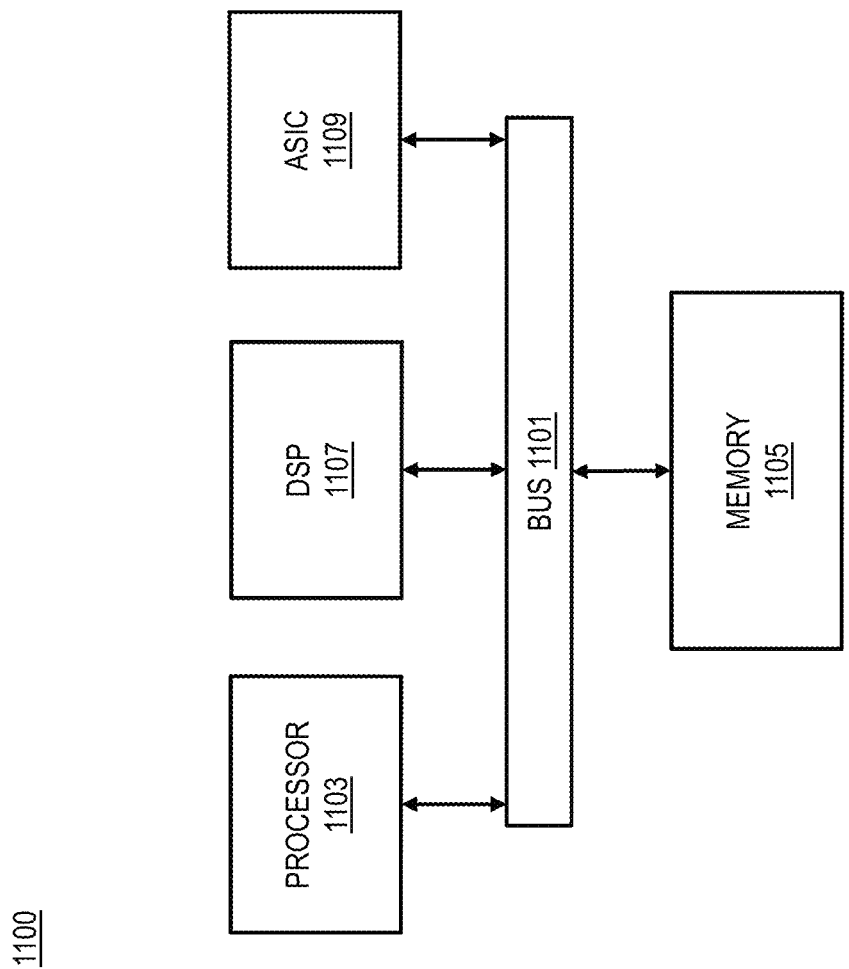
FIG. 11 is a diagram of a chip set that can be used to implement an embodiment of the invention.

FIG. 4 is a flowchart of a process for sensing based on route bias, according to one embodiment. In one embodiment, the goal processor 103 performs the process 400 and is implemented in, for instance, a chip set including a processor and a memory as shown in FIG. 11. In step 401, the control logic 201 may process and/or facilitate a processing of one or more geo-routes, one or more location anchors, or a combination thereof associated with one or more devices. In one embodiment, the control logic 201 may determine the one or more geo-routes, the one or more location anchors, or a combination thereof based, at least in part, on historical user information, predicted user information, or a combination thereof. Next, in step 403, the control logic 201 may determine proximity information of the one or more devices to one or more sensing goals based on the processing of the one or more geo-routes, the one or more location anchors, or a combination thereof. Proximity information may include, at least in part, location proximity information, temporal proximity information, contextual proximity information, or a combination thereof. The control logic 201 may later use such information, for instance, to select at least a subset of the one or more devices to participate in the one or more sensing goals.

Once proximity information is found, the control logic 201 may determine a degree of biasing to apply to the one or more geo-routes, the one or more location anchors, or a combination thereof to direct the one or more devices to the one or more sensing goals (step 405). In one embodiment, step 405 may further include determining context information, user preference information, or a combination thereof associated with the one or more devices, wherein the selection of the at least a subset is further based, at least in part, on the context information, the user preference information, or a combination thereof.

For step 407, the control logic 201 may evaluate relative proximity information or degrees of biasing associated with one or more devices and one or more sensing goals (step 407). Consequently, the control logic 201 may cause, at least in part, a selection of the at least a subset of the one or more devices to participate in the one or more sensing goals based, at least in part, on the proximity information (step 409). Where biasing is taken into consideration in addition to proximity, the control logic determines the degree of biasing, wherein the selection of the at least one subset is further based, at least in part, on the degree of biasing (step 409). In one embodiment, the selection may further trigger the goal processor 103 to cause, at least in part, a generation of one or more requests to participate in the one or more sensing goals, and cause, at least in part, a transmission of the one or more requests to the one or more devices, the at least a subset of the one or more devices, or a combination thereof based, at least in part, on the proximity information. In another embodiment, the control logic 201 may further determine navigation guidance information to cause, at least in part, a biasing of the one or more geo-routes, the one or more location anchors, or a combination thereof, wherein the navigation guidance information directs the at least a subset of the one or more devices to the one or more sensing goals.

Figure 5:
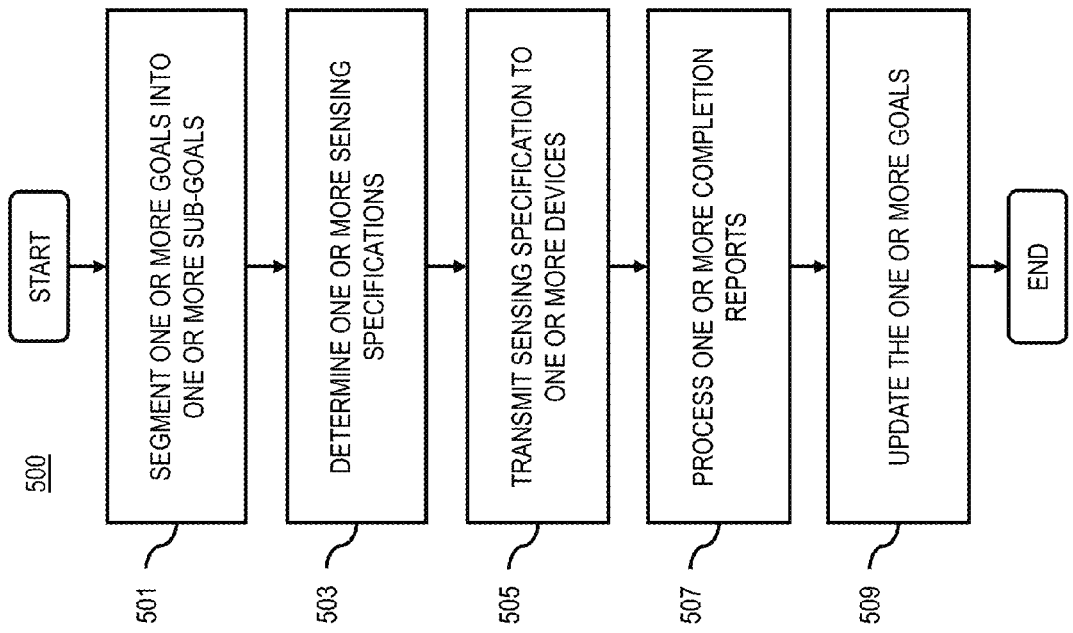
FIG. 5 is a flowchart of a process for one or more devices to participate in one or more sensing goals, according to one embodiment.

FIG. 5 is a flowchart of a process for one or more devices to participate in the one or more sensing goals, according to one embodiment. In one embodiment, the sample platform 207 performs the process 500 and is implemented in, for instance, a chip set including a processor and a memory as shown in FIG. 11. For step 501, the controller 301 may cause, at least in part, a segmentation of the one or more goals into one or more sub-goals and cause, at least in part, an assignment of the one or more sub-goals to the at least one subset of the one or more devices based, at least in part, on proximity information. Next, the controller 301 may determine one or more sensing specifications associated with the one or more goals, the one or more sub-goals, or a combination thereof (step 503). Then, the controller 301 may cause, at least in part, a transmission of the one or more sensing specifications to the at least one subset of the one or more devices (step 505). Once a sample is taken, the controller 301 may process and/or facilitate a processing of one or more completion reports of the one or more goals, the one or more sub-goals, or a combination thereof (step 507). Then, the controller 301, communication network 105, and database 107 may use the processing to cause, at least in part, an updating of the one or more goals, the one or more sub-goals, the assignment, the selection of the at least a subset of the one or more devices, or a combination thereof.

Figure 6:
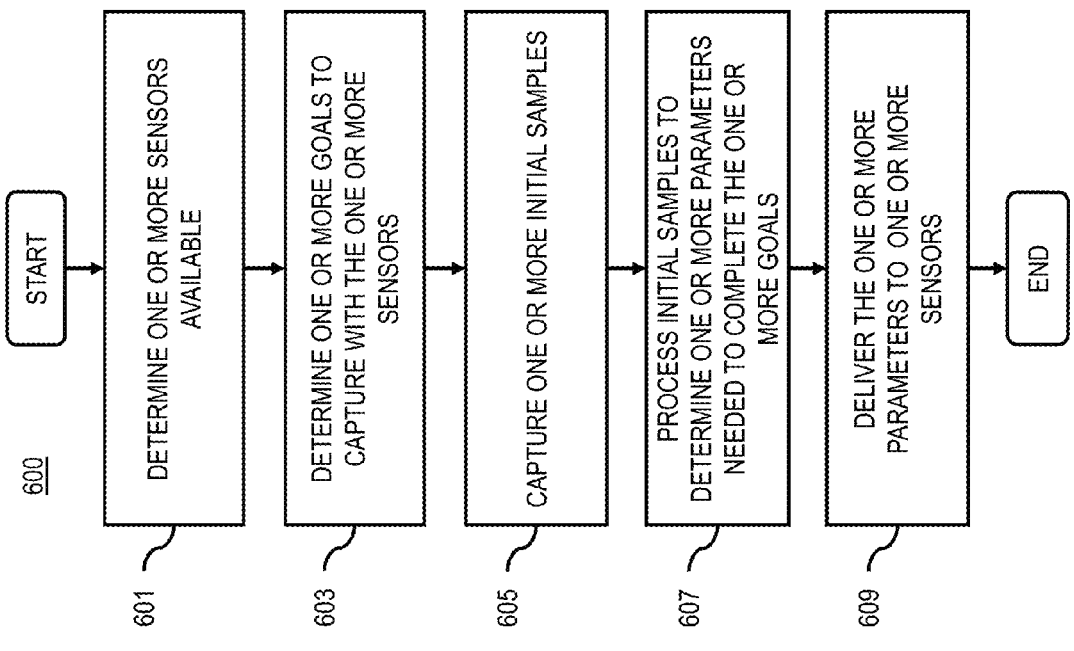
FIG. 6 is a flowchart of a process for defining one or more sensing goals, according to one embodiment.

FIG. 6 is a flowchart of a process for defining one or more sensing goals, according to one embodiment. In one instance, to initial process 600, sample platform 207 may determine one or more sensors available at the one or more UEs 101 (step 601). For example, the one or more sensors may include sensors for capturing one or more samples or sensors for providing context information. Such sensors may include cameras or various measurement gauges for capturing the sample or context information sensors such as location or orientation sensors. Next, at step 603, the sample platform 207 may determine one or more goals to capture with the one or more sensors. In one scenario, a user may identify a goal to achieve using the one or more sensors available. As previously discussed, such a goal may be defined by any sensing parameter, such as location, time, and/or activity. Such goals may include building a model of a stationary object, modeling a moving entity, such as a mob or parade, monitoring air quality, etc. In one embodiment where a sensing goal is defined as a photographic application, the absolute position of one or more UEs 101 may be determined by a GPS-based location system. The system 100 may then reference location coordinates against a mapping system that details objects (such as buildings) present at the location.

To get a sense of how to complete the goal, sample platform 207 may capture one or more initial samples (step 605). Once there are initial samples, the sample platform 207 may process the one or more initial samples to determine one or more parameters needed to complete the one or more goals (step 607). For instance, one or more parameters may include the sensing specifications for the samples, as well as the number of samples needed to complete the one or more sensing goals. Continuing from the previously discussed photographic sensing goal, the referencing of location coordinates against a mapping system may be improved by using a sampled photograph from one or more UEs 101 participating, to cross reference an image library to determine one or more parameters. In another embodiment, the system 100 may invite one or more UEs 101 to enter a text-based description of the location and nature of the sensing goal. In a further embodiment, the system 100 may detect the absolute location of one or more UEs 101 using GPS means and invite the one or more UEs 101 to select a sensing goal based on the capability of the sensors embedded in the one or more mobile terminals of the respective one or more UEs 101. In yet another further embodiment, the system 100 may invite one or more UEs 101 to qualify the exact location of the sensing goal.

Optionally, the system 100 may update the one or more parameters by comparing the sensing goal and location to a database of previously completed sensing goals. In one such case, the one or more UEs 101 may be notified if the sensing goal is completed. In one instance, the system 100 may present the one or more UEs 101 with a number of options, one of which may include extending a dataset (or a completed goal) by adding additional samples.

To determine the number and nature of samples to acquire to achieve the sensing goal, the system 100 may use a number of methods, some of which may depend on the sensing goal. For photographic applications, for instance, the system 100 may reference a satellite image of the location of approximate dimensions, profile, and accessibility by users. The system 100 may define a number of points around a perimeter of the sensing goal based on the building size, profile, likely distances of one or more UEs 101 from the building, and the orientation of each of the UEs 101 to capture samples. For non-photographic applications, the system 100 may use templates to interact with the one or more UEs 101 to determine sensing profiles with parameters other than spatial factors. One such profile may include a time variant sensing profile.

Finally, in step 609, the sample platform 207 may deliver the one or more parameters to one or more sensors for the one or more sensors to participate in the one or more defined sensing goals. As previously discussed, the system 100 may invite one or more UEs 101 to contribute to a sensing goal based on the proximity to the sensing goal, expressed interest in achieving goals of a similar type, and general proximity of the sensing goal or other criteria. In particular, the system 100 may select one or more UEs 101 to participate based on geo-routes and/or location anchors of respective UEs 101 being located in proximity to the sensing goal. In other words, the system 100 selects the UEs 101 based on the degree of "route bias" needed to participate in the sensing goal. This may include UEs 101 that are, according to their geo-routines and/or location anchors, likely to be at or proximate to the sensing goal at particular times for time variant sensing goals.

Figure 7:
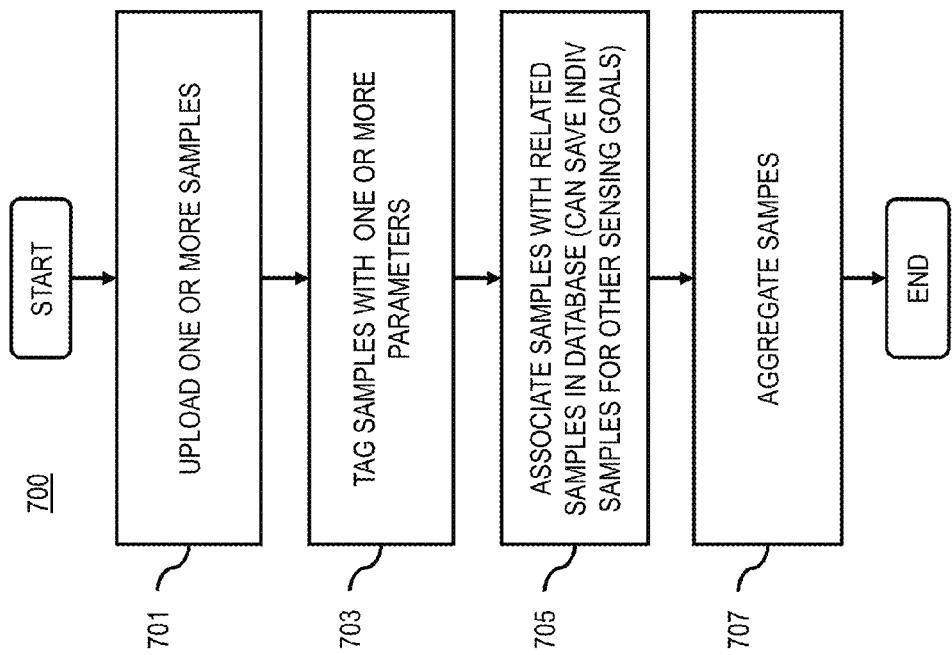
FIG. 7 is a flowchart of a process for sharing one or more sensing goals, according to one embodiment.

FIG. 7 is a flowchart of a process for sharing one or more sensing goals, according to one embodiment. In one embodiment, to initiate process 700, one or more UEs 101 may upload one or more samples to one or more databases 107 (step 701). As previously discussed, the goal processor 103 may provide one or more UEs 101 with directions on how to obtain the sample, including navigation guidance and sensing specifications. The goal processor 103 may then tag one or more samples with parameters such as the location and orientation of the one or more samples (step 703). As a result, the system 100 may associate samples with related samples in the one or more databases 107 (step 705). In one embodiment, the goal processor 103 may associate the samples by comparing samples with unexpected location and/or orientation information with the samples required. Then, the system 100 may aggregate the one or more samples to share in the system 100 (step 707). If the location and/or orientation information of a sample matches the specifications of samples required, the system 100 may retain the sample and update the sensing goal to account for the contribution. This process may be iterated multiple times until the sensing goal is achieved. In one embodiment, the goal processor 103 may notify all the participating UEs 101 when the goal is achieved. In another embodiment, the samples, in raw or processed form, may be available to all contributors.

Figure 8:
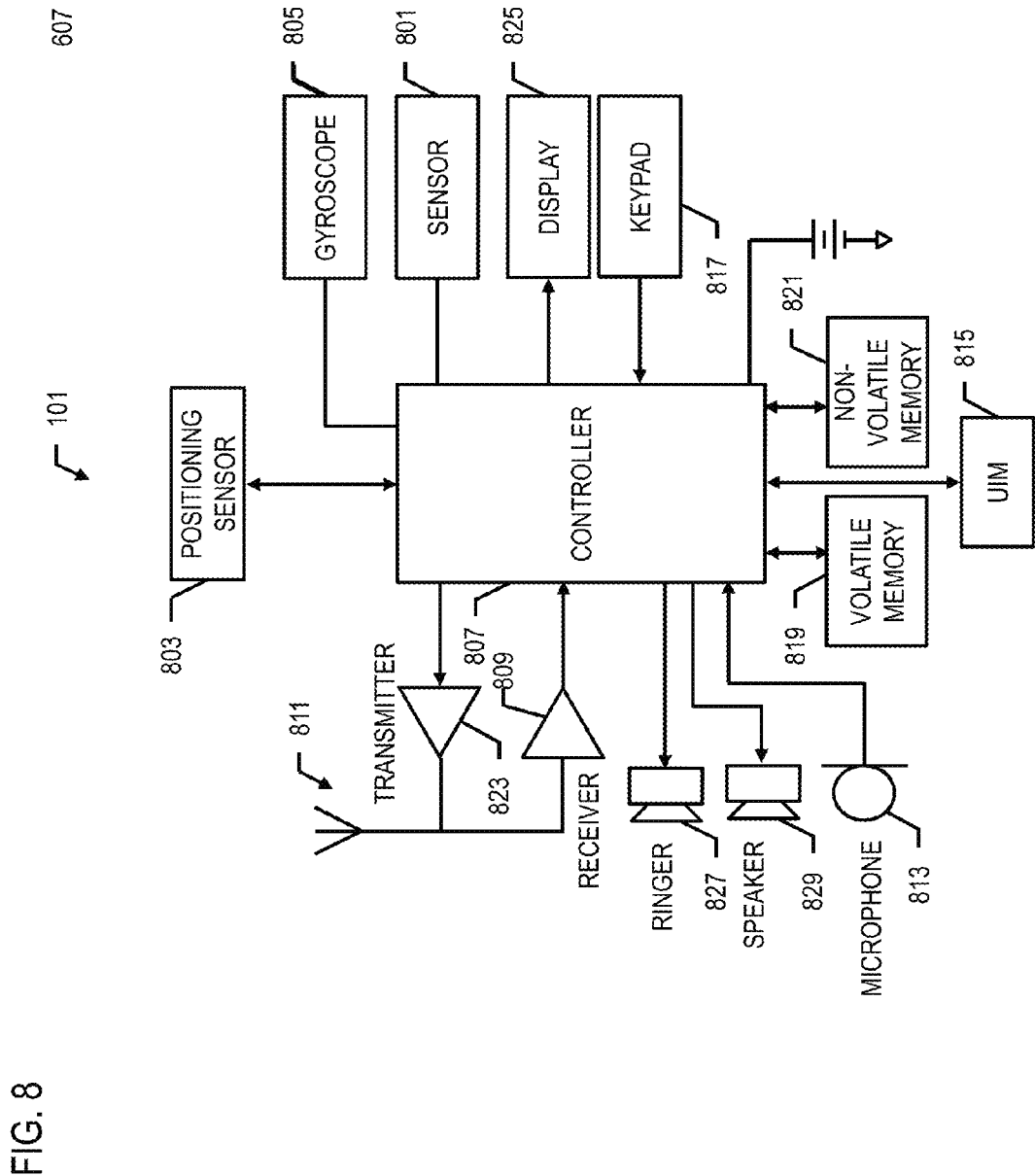
FIG. 8 is a schematic block diagram of a terminal of one or more user devices, according to one embodiment.

FIG. 8 is a schematic block diagram of a terminal of one or more user devices, according to one embodiment. In one embodiment, the one or more UEs 101 have one or more sensors 801. The sensors may be of sensor types, including sensors for one or more cameras, temperatures, chemical and/or biological substances, location, orientation, or some combination thereof. For instance, the sensors 801 may include CMOS or CCD as part of a camera system. In another example, the sensors 801 may include features with at least one means of determining the absolute location of the device and its orientation. In one scenario, such sensors 801 may include one or more positioning sensors 803. In a further example, the sensors 801 may include a GPS-based location system and gyroscope (e.g., gyroscope 805) and/or electric compass to better orient the one or more UEs 101 for collecting samples. In addition, in one embodiment, the one or more UEs 101 may have a controller 807 for handling components of the one or more UEs 101, such as the sensors 801, positioning sensors 803, etc. The controller 807 may also interact with receiver 809 (e.g., that receives data received via antenna 811), microphone 813, universal input methods (UIM) 815, and a keypad 817 to receive other inputs. Other components include memories 819 and 821 for storing and accessing data, a transmitter 823 for transmitting data, a display 825 for rendering information to users, a ringer 827 for alerting users (e.g., alarm, phone calls, etc.), a speaker 829 for presenting audio to users, etc.

Figure 9A:
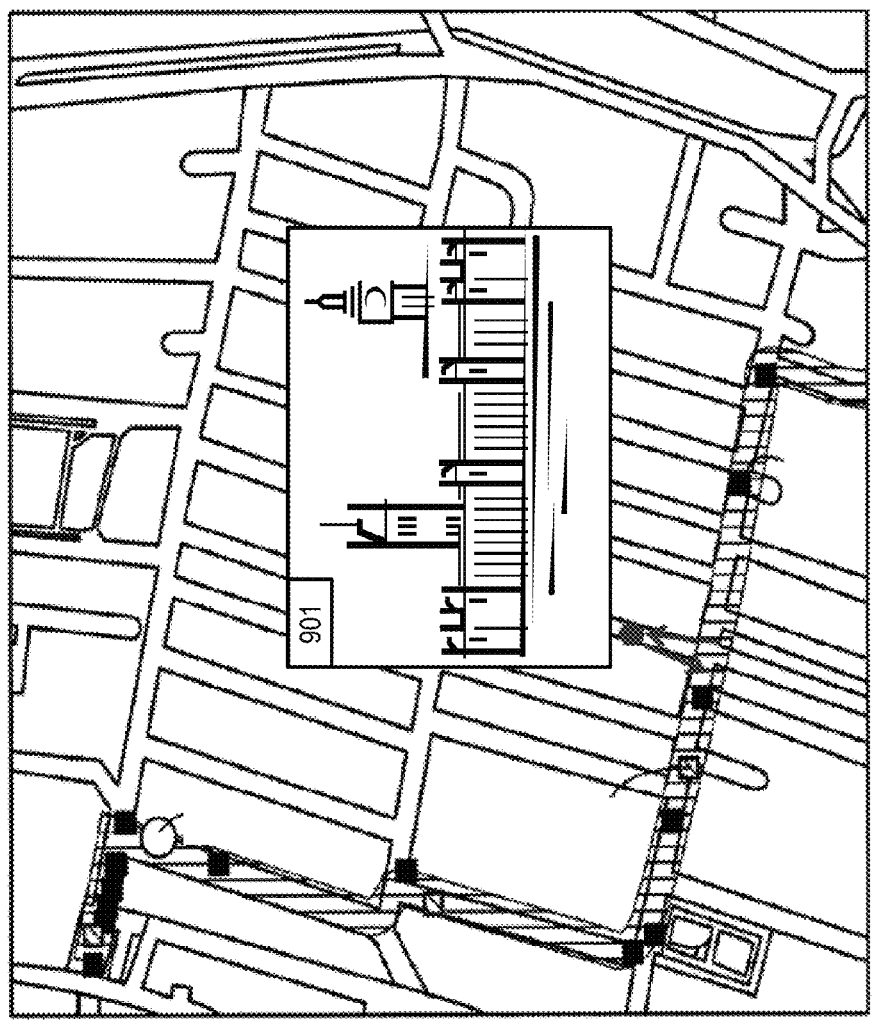
FIGS. 9A-9C are diagrams of use cases utilized in the processes of FIG. 4, according to various embodiments.
Figure 9B:
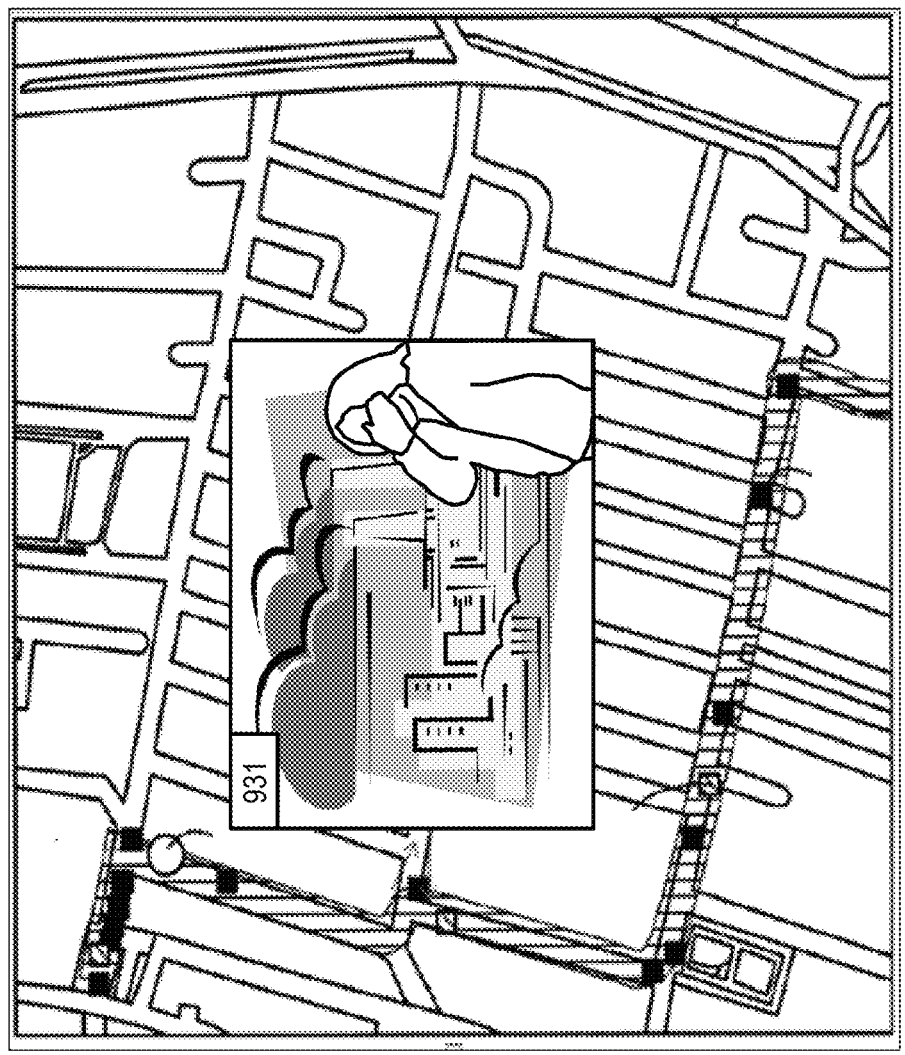
Figure 9C:
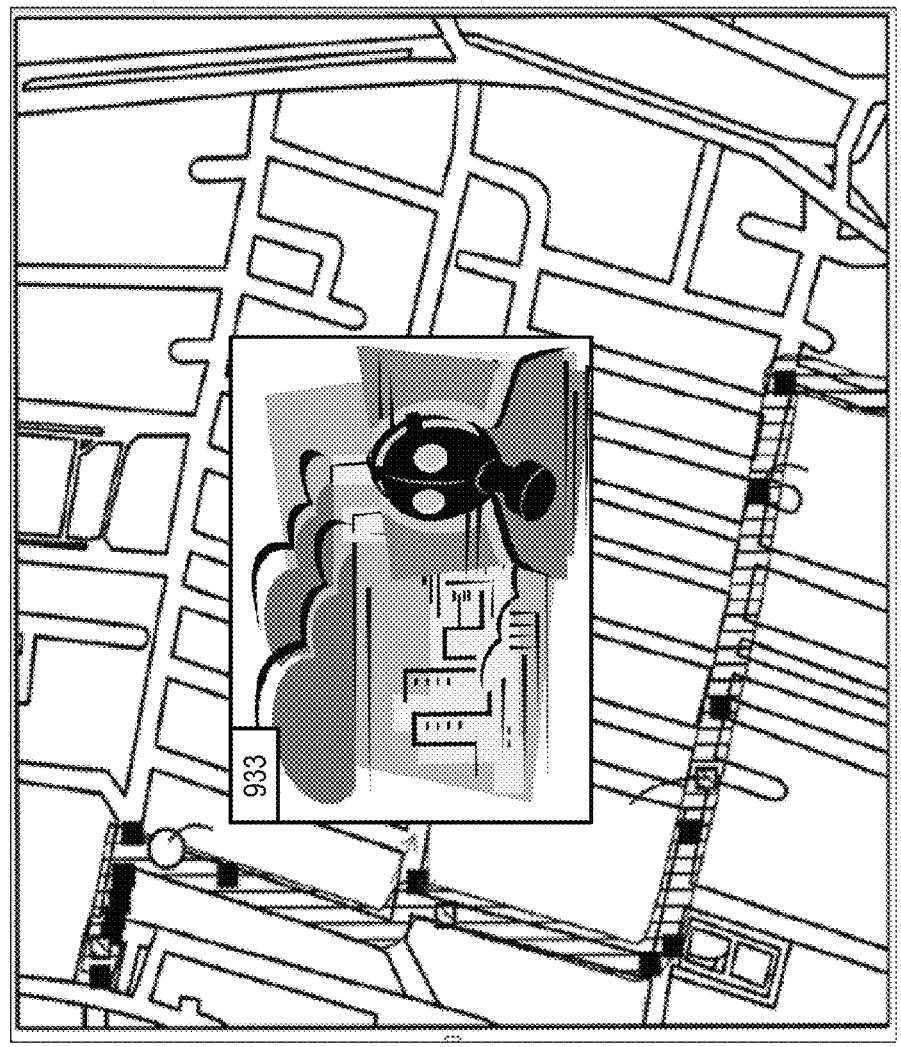

FIGS. 9A-9C are diagrams of use cases utilized in the processes of FIG. 4, according to various embodiments. FIG. 9A shows one possible sensing goal being the Houses of Parliament in London, UK as a 3D photographic goal. In one embodiment, one user may take an initial photograph of the Houses of Parliament (e.g., photograph 901) and set it as a sensing goal. With the processes of FIG. 4, the system 100 may then calculate the required characteristics, including sensing specifications and/or number of samples needed for subsequent sampling to complete the 3D photographic goal. Next, the goal processor 103 may invite one or more other UEs 101 to contribute to the sensing goal, according to the degree of route bias as described in the process of FIG. 4. As previously discussed, the goal processor 103 and database 107 may continually aggregate the samples to build the sensing goal.

FIGS. 9B and 9C show a further use case wherein the sensing goal may be observation of a certain area. For instance, system 100 may observe an area, such as a street or a specific point location, to analyze a specific context. In one scenario, such a context may be air pollution. In one embodiment, the sensing goal of observing the air pollution of a certain area may be set by a user. In such a case, the user may contribute the first samples (e.g., sample 931), then invite other users to contribute samples as well (e.g., sample 933). In one scenario, one or more other UEs 101 may be prompted to contribute samples on a time-variant basis. As previously described, the system 100 may facilitate the contribution from one or more UEs 101 by biasing geo-routes or anchor points of the respective one or more UEs 101 that are in proximity of the sensing area.

The processes described herein for sensing based on route bias may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
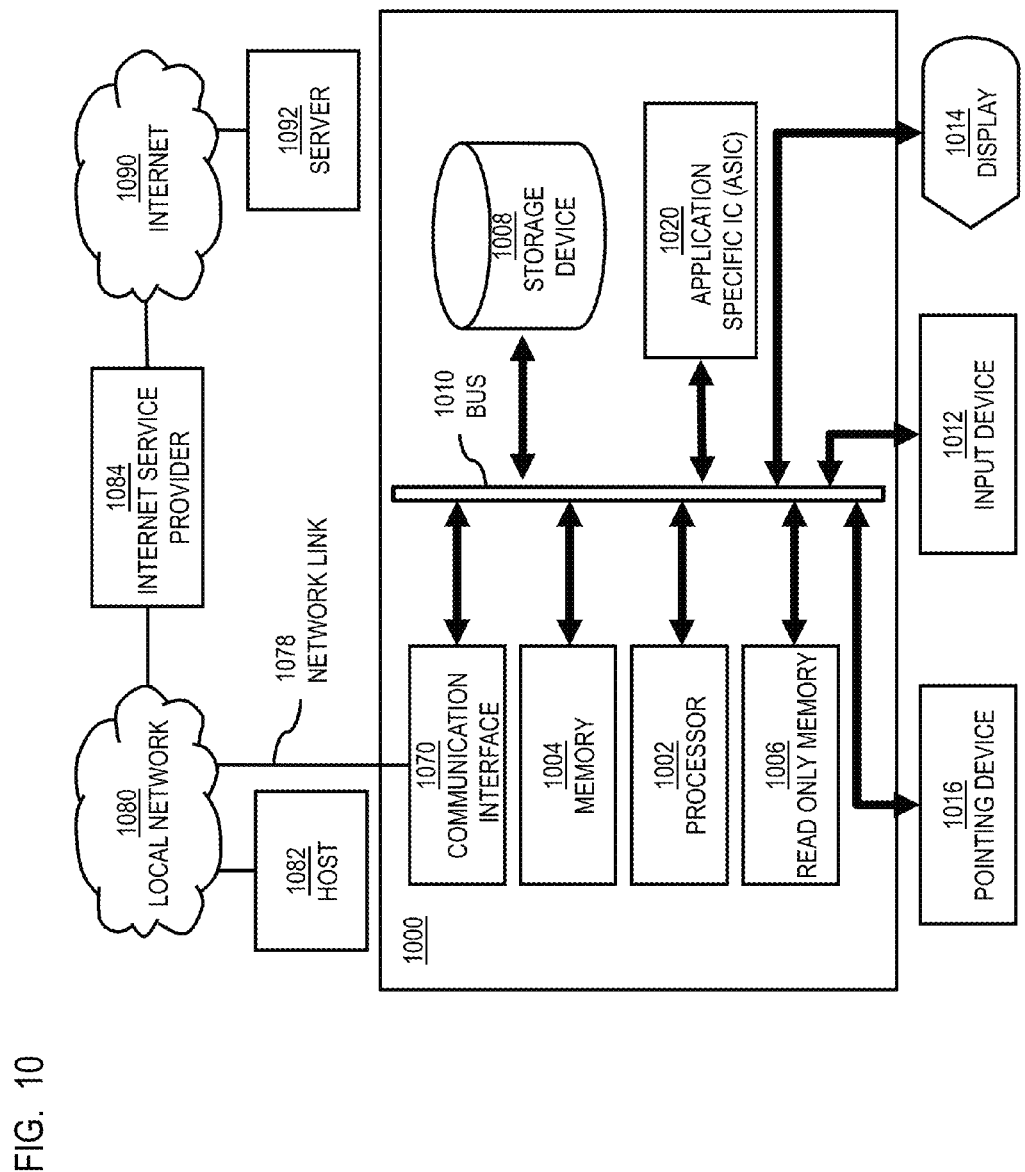
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to sensing based on route bias as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of sensing based on route bias.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to sensing based on route bias. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for sensing based on route bias. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for sensing based on route bias, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for sensing based on route bias to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to sensing based on route bias as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of sensing based on route bias.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to sensing based on route bias. The memory 1105 also stores the data associated with or generated by the execution of the inventive steps.

Figure 12:
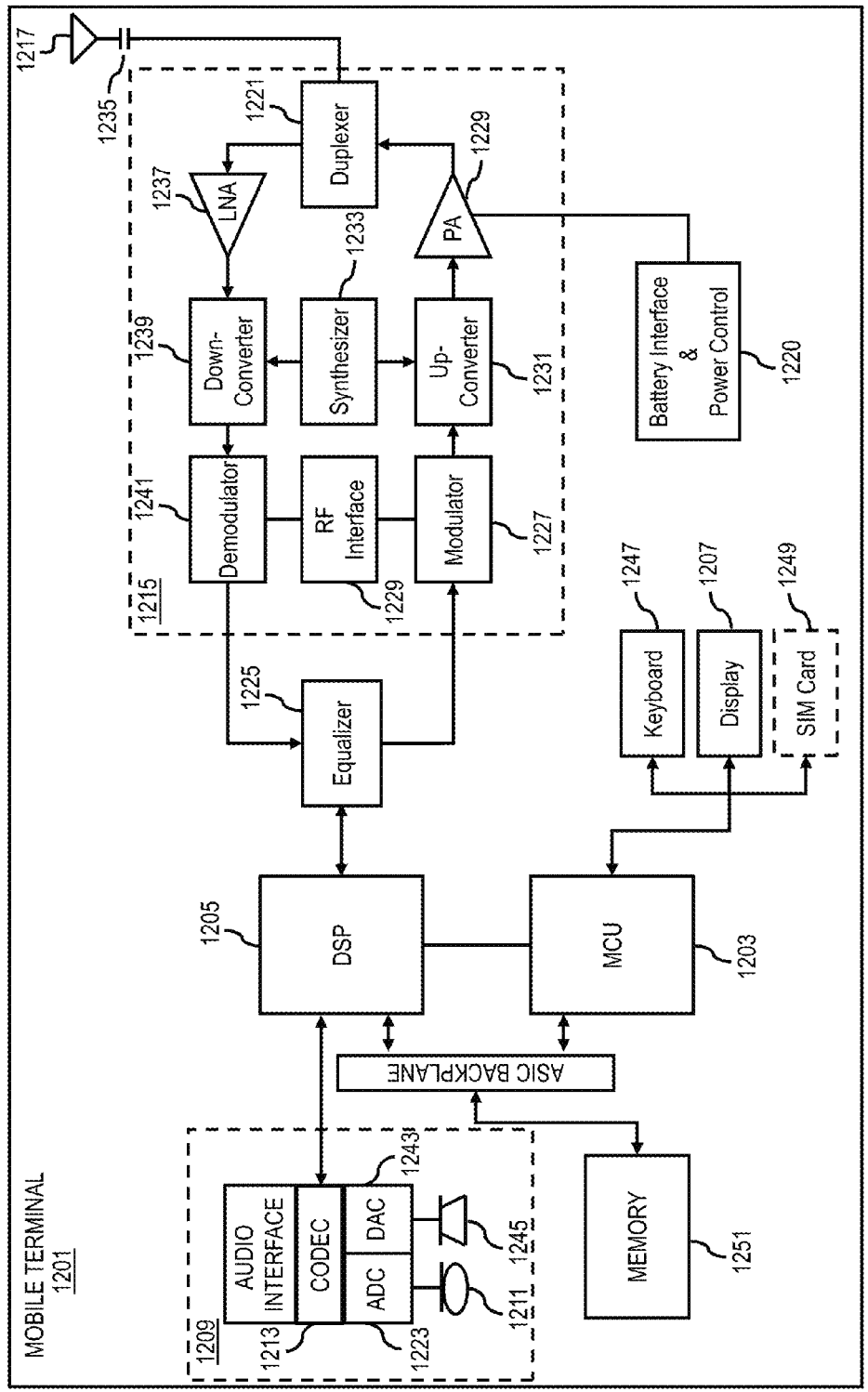
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of sensing based on route bias. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of sensing based on route bias. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to sensing based on route bias. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing by a processor one or more predicted geo-routes, one or more predicted location anchors, or a combination thereof physically associated with a user of one or more devices to determine proximity information of the one or more devices to one or more sensing goals;
   determining a degree of biasing to apply to the one or more predicted geo-routes, the one or more predicted location anchors, or a combination thereof to direct the user to physically move the one or more devices near or at one or more points of interest in order to capture sensor data based, at least in part, on the one or more sensing goals; and
   selecting at least a subset of the one or more devices to participate in the one or more sensing goals based, at least in part, on the proximity information, the degree of biasing, or a combination thereof.

2. A method of claim 1, further comprising:
   causing, at least in part, capturing of the sensor data by the at least a subset based at least in part, on the proximity information, the degree of biasing, or a combination thereof,
   wherein the one or more predicted location anchors are determined based on one or more user past locations, one or more user routine locations, or a combination thereof, and
   wherein the one or more predicted geo-routes are determined based on one or more user past routes, one or more user routine routes, one or more user planned routes, or a combination thereof.

3. A method of claim 1, further comprising:
   causing, at least in part, a segmentation of the one or more sensing goals into one or more sub-goals; and
   causing, at least in part, an assignment of the one or more sub-goals to the at least a subset of the one or more devices based, at least in part, on the proximity information,
   wherein the one or more sensing goals include capturing sensor data of the one or more points of interest, at one or more timings, of one or more events, or a combination thereof, and
   the degree of biasing is determined based on one or more deviations of the one or more devices from the one or more predicted geo-routes, the one or more predicted location anchors, or a combination thereof, to be near or at one or more points of interest.

4. A method of claim 3, further comprising:
   determining one or more sensing specifications of the one or more sensing goals, the one or more sub-goals, or a combination thereof, associated with the one or more timings; and
   causing, at least in part, a transmission of the one or more sensing specifications to the at least a subset of the one or more devices,
   wherein the degree of biasing is determined further based on one or more deviations of the one or more timings from one or more user routine timings associated with the one or more predicted geo-routes, the one or more predicted location anchors, or a combination thereof.

5. A method of claim 3, further comprising:
   processing one or more completion reports of the one or more sensing goals, the one or more sub-goals, or a combination to cause, at least in part, an updating of the one or more sensing goals, the one or more sub-goals, the assignment, the selection of the at least a subset of the one or more devices, or a combination thereof, wherein the one or more sensing goals include capturing sensor data at a time variant basis.

6. A method of claim 1, further comprising:
determining navigation guidance information to cause, at least in part, a biasing of the one or more predicted geo-routes, the one or more predicted location anchors, or a combination thereof,
wherein the navigation guidance information directs the at least a subset of the one or more devices to be physically moved to capture the sensor data based, at least in part, on the one or more sensing goals.

7. A method of claim 1, further comprising:
causing, at least in part, a generation of one or more requests to participate in the one or more sensing goals; and
causing, at least in part, a transmission of the one or more requests to the one or more devices, the at least a subset of the one or more devices, or a combination thereof based, at least in part, on the proximity information.

8. A method of claim 1, further comprising:
determining contextual information, user preference information, or a combination thereof associated with the user, the one or more devices, or a combination thereof,
wherein the selection of the at least a subset is further based, at least in part, on the contextual information, the user preference information, or a combination thereof.

9. A method of claim 1, further comprising:
determining the one or more predicted geo-routes, the one or more predicted location anchors, or a combination thereof based, at least in part, on historical user information, predicted user information, or a combination thereof.

10. A method of claim 1, wherein the proximity information includes, at least in part, location proximity information, temporal proximity information, contextual proximity information, or a combination thereof, and
the one or more predicted geo-routes include one or more user routine routes, one or more user current routes, or a combination thereof.

11. An apparatus comprising:
at least one processor; and
at least one memory including computer program code,
the at least one memory and the computer program code configured to, with the at least one processor, cause the apparatus to perform at least the following,
process and/or facilitate a processing of one or more predicted geo-routes, one or more predicted location anchors, or a combination thereof physically associated with a user of one or more devices to determine proximity information of the one or more devices to one or more sensing goals;
determine a degree of biasing to apply to the one or more predicted geo-routes, the one or more predicted location anchors, or a combination thereof to direct the user to physically move the one or more devices near or at one or more points of interest in order to capture sensor data based, at least in part, on the one or more sensing goals; and
cause, at least in part, a selection of at least a subset of the one or more devices to participate in the one or more sensing goals based, at least in part, on the proximity information, the degree of biasing, or a combination thereof.

12. An apparatus of claim 11, wherein the apparatus is further caused to:
cause, at least in part, a segmentation of the one or more sensing goals into one or more sub-goals; and
cause, at least in part, an assignment of the one or more sub-goals to the at least a subset of the one or more devices based, at least in part, on the proximity information.

13. An apparatus of claim 12, wherein the apparatus is further caused to:
determine one or more sensing specifications associated with the one or more sensing goals, the one or more sub-goals, or a combination thereof; and
cause, at least in part, a transmission of the one or more sensing specifications to the at least a subset of the one or more devices.

14. An apparatus of claim 12, wherein the apparatus is further caused to:
process and/or facilitate a processing of one or more completion reports of the one or more sensing goals, the one or more sub-goals, or a combination to cause, at least in part, an updating of the one or more sensing goals, the one or more sub-goals, the assignment, the selection of the at least a subset of the one or more devices, or a combination thereof.

15. An apparatus of claim 11, wherein the apparatus is further caused to:
determine navigation guidance information to cause, at least in part, a biasing of the one or more predicted geo-routes, the one or more predicted location anchors, or a combination thereof,
wherein the navigation guidance information directs the at least a subset of the one or more devices to be physically moved to capture the sensor data based, at least in part, on the one or more sensing goals.

16. An apparatus of claim 11, wherein the apparatus is further caused to:
cause, at least in part, a generation of one or more requests to participate in the one or more sensing goals; and
cause, at least in part, a transmission of the one or more requests to the one or more devices, the at least a subset of the one or more devices, or a combination thereof based, at least in part, on the proximity information.

17. An apparatus of claim 11, wherein the apparatus is further caused to:
determine contextual information, user preference information, or a combination thereof associated with the one or more devices,
wherein the selection of the at least a subset is further based, at least in part, on the contextual information, the user preference information, or a combination thereof.

18. An apparatus of claim 11, wherein the apparatus is further caused to:
determine the one or more predicted geo-routes, the one or more predicted location anchors, or a combination thereof based, at least in part, on historical user information, predicted user information, or a combination thereof.

19. An apparatus of claim 11, wherein the proximity information includes, at least in part, location proximity information, temporal proximity information, contextual proximity information, or a combination thereof.

* * * * *